United States Patent [19]

McVicker

[11] 4,364,148
[45] Dec. 21, 1982

[54] COMBINATION CASTOR AND JACK MEANS APPARATUS

[75] Inventor: Harry J. McVicker, Pottstown, Pa.
[73] Assignee: Sperry Corporation, New York, N.Y.
[21] Appl. No.: 219,049
[22] Filed: Dec. 22, 1980
[51] Int. Cl.³ .................... B60B 33/06; F16M 11/24
[52] U.S. Cl. .................... 16/32; 248/188.2; 248/647
[58] Field of Search ............. 16/32, 33, 34; 280/766, 280/43.14, 43.2, 43.21; 248/646, 647, 188.1, 188.2, 188.7; 182/82, 108; 254/DIG. 1, DIG. 2

[56] References Cited

U.S. PATENT DOCUMENTS

| | | | |
|---|---|---|---|
| 1,017,464 | 2/1912 | Rae | 16/32 |
| 1,772,314 | 8/1930 | Hormes | 16/32 X |
| 2,559,856 | 7/1951 | Edhlund | 182/108 X |
| 2,697,243 | 12/1954 | Shager | 280/43.14 |
| 2,879,075 | 3/1959 | Wallace | 280/43.2 |
| 3,195,859 | 7/1965 | Jackson et al. | 280/43.21 |
| 3,312,432 | 4/1967 | Pfeiffer et al. | 248/646 |
| 3,602,464 | 8/1971 | Orii | 280/43.14 X |
| 4,077,086 | 3/1978 | Butler | 16/33 |

*Primary Examiner*—Paul A. Bell
*Assistant Examiner*—John S. Brown
*Attorney, Agent, or Firm*—James R. Bell; Marshall M. Truex

[57] ABSTRACT

A combination dual wheel castor and jack combination assembly is disclosed. The assembly comprises a support structure having a nut-like portion and elongated portions attached to the nut-like portion. The elongated portions extend from the nut-like portion in opposite directions. The support structure includes a hole passing through at least one of the elongated portions and the nut-like portion. The hole is internally threaded along at least a portion of its length. A jack means comprising an elongated threaded shaft portion and a foot portion rotatably mounted to one end of said shaft portion is adapted to be threaded into the hole in the support structure. By gripping and turning the nut-like portion of the support structure, the shaft portion of the jack means is caused to move relative to the support structure in one direction or the other. A castor portion of the assembly comprises a pair of wheels which are spaced apart and attached to a swivel frame by an axle. The wheels are free to rotate about the axle. The swivel frame is rotatably mounted to the support structure. The foot portion of the jack means is disposed between the pair of wheels. When the frame has been moved to a predetermined location on the floor, the jack means is lowered until the foot portion contacts the floor and exerts enough pressure to remove the weight of the frame and the equipment from the castor wheels. The foot portion of the support structure includes a hole which is aligned with a hole in the floor. A bolt is passed through the hole in the floor and the hole in the foot portion to attach the frame firmly to the floor.

2 Claims, 3 Drawing Figures

COMBINATION CASTOR AND JACK MEANS APPARATUS

BACKGROUND OF THE INVENTION

1. Field of the Invention

The present invention relates to a support structure for a moveable equipment frame, particularly to a support structure which facilitates movement, jacking and attachment of the frame to a floor in an integrated support structure.

2. Description of the Prior Art

In order to facilitate initial installation or relocation of heavy equipment or machinery, the equipment or machinery is mounted on large frames which in turn are supported by a number of castor assemblies (which must be mounted to the corners, etc. of the frame). The castor comprises a wheel or wheels mounted on a swivel frame.

Once the equipment is positioned properly on the floor, it is fixed in position by lifting the weight of the frame with the equipment thereon off the castor assembly. This is sometimes accomplished by a jack assembly mounted to the corners, etc. of the frame. The jack assemblies are mounted separately from the castor assemblies and are located outside the castor assembly nearest the actual corner of the frame since this location represents the strongest part of the frame. A foot portion of the jack assembly is lowered until it contacts the floor exerting pressure thereon, lifting the weight of the equipment and frame off of the wheels of the castor.

Computer equipment mounted on frames is often transported into specially designed rooms with raised floors. The frames are rolled on the castor assemblies with the jack assemblies left dangling on the frame during transportation. As the frame is pushed onto or from a ramp leading to the raised floor, the dangling jack assembly is often the first item to contact either the ramp or the lower floor. Continued movement of the frame will bend the jack assembly rendering it useless.

It is sometimes desirable to attach firmly the frame to the floor to provide a degree of earthquake protection. This is accomplished by providing a hole in the frame near the corners. The frame is positioned over holes in the floor and bolts are passed through the holes in the floor and the frame to attach the frame to the floor.

Equipping a frame with a castor assembly, a jack assembly and a tie-down point often results in several cumbersome and expensive machining operations. It is desirable, therefore, to avoid the need for separate assemblies e.g., for the castor, jack and tie-down functions, and, at the same time, to avoid damage to the various assemblies, such as the jack assembly, during transportation or movement of the frame. It is desirable, therefore, to provide an integrated structure to perform all the above functions without damage thereto.

SUMMARY OF THE INVENTION

The present invention comprises a combination castor and jack for use with heavy equipment or machinery mounted on frames. It comprises a support structure or coupling means for mounting the castor/jack combination to the frame. In the preferred embodiment, the support structure includes a nut-like portion and an elongated portion extending away from the nut-like portion. The support structure has a center hole extending therethrough with a portion of the hole being internally threaded.

The combination further includes a jack means adjustably mounted to the support structure for fixing the position of the frame and equipment at a particular predetermined location on the floor where the equipment is to be utilized. The jack means is moveable relative to the support structure and frame between a remote position (when it is desired to allow the frame to be moved on the castor) and a contact position. When it is desired to fix the frame in a particular location, the jack means is moved to the contact position where it comes in contact with the floor exerting enough pressure thereon to remove the weight of the frame and equipment from the castor.

In the preferred embodiment, the jack means comprises an elongated shaft portion and a foot portion rotatably connected to one end of the shaft portion. The shaft portion is threaded at least along a part of its length and is formed to be screwed into the internally threaded hole of the support structure. The nut-like portion of the support structure facilitates turning of the support structure causing the jack means to be moved one way or the other within the hole.

The castor portion of the castor/jack combination comprises a pair of spaced apart wheels mounted to a swivel frame which frame is rotatably mounted to the support structure. In the preferred embodiment, the foot portion of the jack means is disposed between the wheels when in the remote position. The foot portion can be moved up and down between the wheels to contact the floor when so desired. When the jack means is in the remote position, the foot portion is free to rotate with the castor wheels.

In the preferred embodiment, the foot portion comprises a hole therethrough which is adapted to receive a bolt from the floor at an appropriate location. The bolt passes through the hole in the floor and the hole in the foot portion where it is captured by a nut. This serves to attach the frame to the floor and provides a degree of earthquake protection.

The objects, features and advantages of the present invention will become more fully apparent from the following detailed description of the preferred embodiment, the appended claims and the accompanying drawings in which:

DETAILED DESCRIPTION OF THE DRAWINGS

Figure 1:
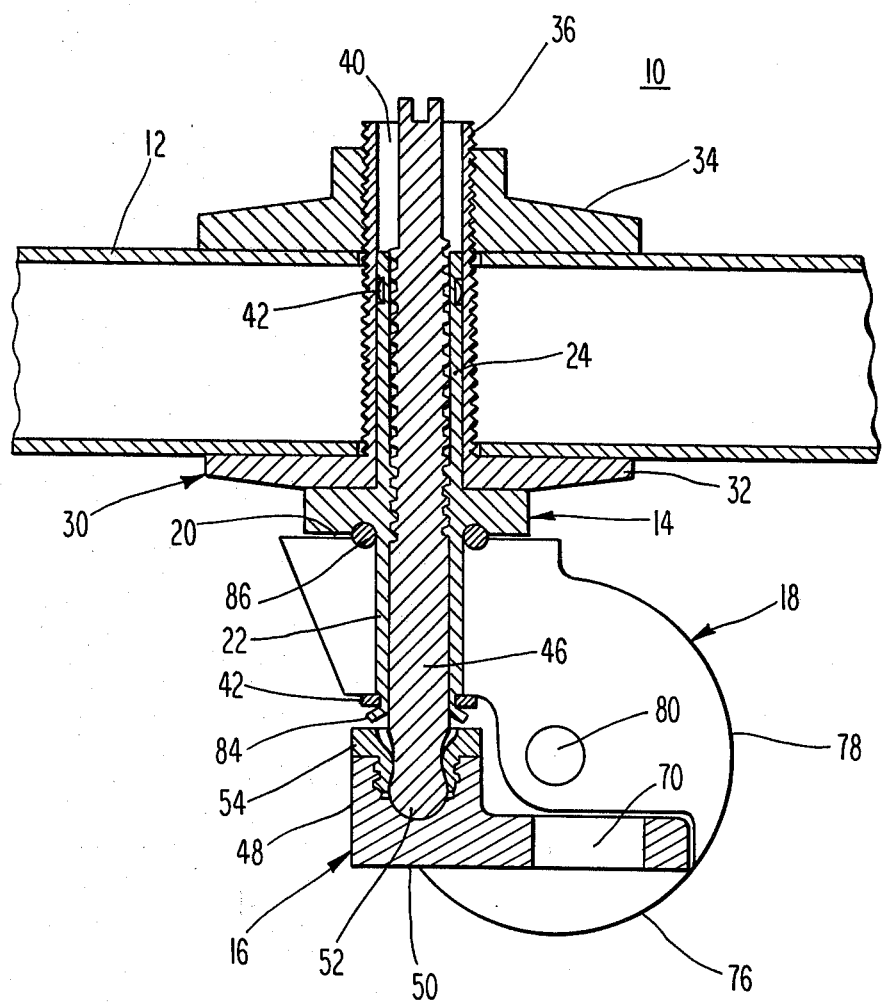
FIG. 1 is a side elevational view of a preferred embodiment of the present invention shown partially in cross-section and partially broken away.
Figure 2:
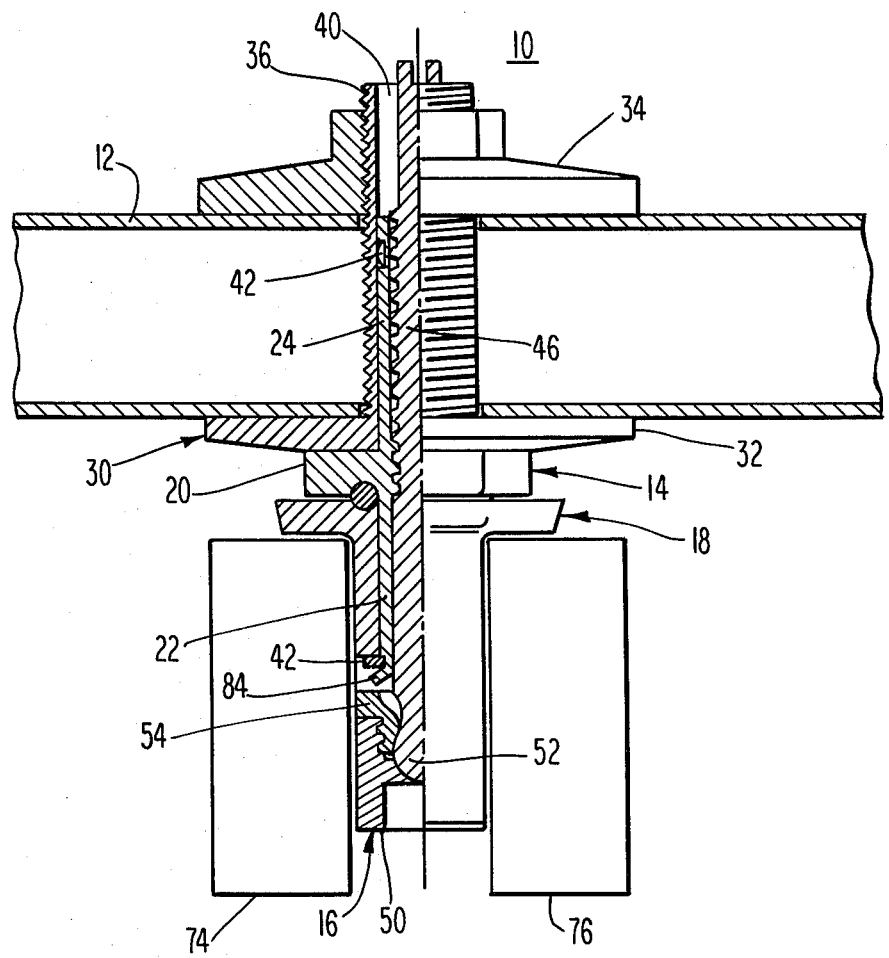
FIG. 2 is a back elevational view of the invention of FIG. 1 shown partially in cross-section and shown partially broken away.

Referring now to FIGS. 1 and 2, a preferred embodiment castor/jack combination designated generally 10 is shown mounted to a frame 12. The frame 12 usually comprises a rectangularly shaped body made from tubular metal such as steel or aluminum. It is used for movable support of heavy equipment or machinery which is bolted thereto.

The castor/jack combination 10 comprises a support structure designated generally 14; a jack means designated generally 16; and a dual wheel castor designated generally 18. The support structure 14 further comprises a nut-like portion 20 and elongated portions 22 and 24 extending away from the nut-like portion 20 in opposite directions therefrom. The support structure is formed with a hole through its center extending from one end of an elongated portion 22 to the opposite end of elongated portion 24. The hole is threaded along at least a portion of its length. In the FIGS. 1 and 2, the hole of support structure 14 is shown threaded along the nut-like portion 20. It does not have to be threaded here but could be threaded anywhere along its length.

Because most frames are tubular in structure it is desirable to provide additional strength at the point where the castor/jack combination is mounted to the frame. In FIGS. 1 and 2, this is accomplished by inserting a hollow large threaded bolt designated generally 30 in a hole in the frame 12. The head 32 of the bolt 30 fits up against the underside of frame 12 and is firmly attached to the frame by a nut 34 screwed on to the shaft 36 of the bolt against the opposite side of frame 12. The elongated portion 24 of support structure 14 is inserted within hole 40 of the bolt 30. The tolerance between the outer diameter of the support structure 14 and the inner diameter of the hollow shaft of bolt 30 is very small causing the support structure 14 to fit snuggly within bolt 30. In the preferred embodiment, elongated portion 24 is formed with an annular groove in which is inserted a C-ring 42. The outer diameter of C-ring 42 is just slightly larger than the outer diameter for the support structure 14. When the support structure 14 is inserted in hole 40 of bolt 30, C-ring 42 contacts the walls of hole 40 causing a friction fit to exist between the bolt 30 and support structure 14. This prevents the support structure 14 and associated jack means 16 and castor 18 from falling from the frame 12 whenever the frame 12 is lifted for any reason. Where the frame 12 is a solid structure or is already equipped with a reinforced hole therethrough, it may not be necessary to provide a separate bolt 30.

Jack means 16 comprises an elongated shaft portion 46 which is threaded along at least a portion of its length. The shaft portion is formed to be screwed into the partially threaded hole within support structure 14. In FIGS. 1 and 2, the shaft portion 46 is shown passing all the way through the support structure 14. However, this is not necessary and in alternate embodiments the hole 40 in support structure 14 can be capped at the upper end and the shaft portion 46 can be shortened.

Jack means 16 further includes a foot portion 48 having a flat bottom surface 50. Foot portion 48 is rotatably attached to one end of shaft portion 46. In FIGS. 1 and 2, one end of shaft portion 46 narrows and then terminates in a substantially spherical ball 52. The foot portion is formed with a partially threaded cavity which is adequate to receive the ball 52 of shaft portion 46. A tapered threaded nut 54 is screwed into the cavity against the ball capturing the ball within the cavity and forming a ball joint. The foot portion 48 is then free to rotate about ball 52.

Figure 3:
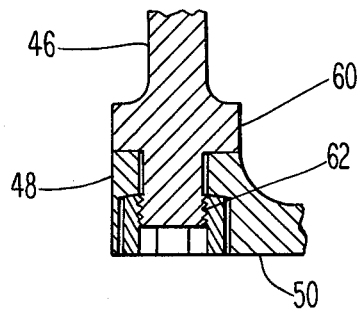
FIG. 3 is an alternate preferred embodiment of a portion of FIG. 1 shown in cross-section.

FIG. 3 shows an alternate preferred embodiment joining of the foot portion 48 to the end of shaft portion 46. The shaft portion 46 is shown with an enlarged circumferential region 60 near a threaded end 62. Foot portion 48 is formed with a first hole through which the threaded end 62 of shaft portion 46 passes and with a second concentric larger hole through which an Allen type threaded nut 66 passes from the opposite end from threaded end 62 of shaft portion 46. The Allen type threaded nut is attached to the threaded end 62 capturing the foot portion 48 between the enlarged circumferential portion 60 of shaft portion 46 and the Allen head nut 66.

Returning to FIGS. 1 and 2, foot portion 48 includes a hole 70. When the frame is positioned at a predetermined location on the floor, a bolt is passed up through a hole in the floor through hole 70 in the foot portion. The bolt is then tightened against foot portion 48 by a nut. This causes the frame 10 to be attached firmly to the floor and provides a degree of earthquake protection.

As shown in FIG. 2, castor 18 comprises a pair of wheels 74 and 76 with only wheel 76 shown in FIG. 1. The wheels are mounted to a swivel frame 78 by an axle located at point 80 in FIG. 1. Wheels 74 and 76 are free to rotate about an axis through point 80 which axis is perpendicular to the plane of the Figure.

The swivel frame 80 is rotatably mounted to support structure 14 between (1) a C-ring 82 located in an annular groove formed at one end of support structure 14 by an outwardly extending edge 84 of support structure 14 and (2) the underside of nut-like portion 20. To facilitate easy rotation of the dual wheel castor 18 a bearing surface 86 such as a race of ball bearings is provided between the top of swivel frame 78 and the underside of nut-like portion 20.

The foot portion 48 is disposed between the wheels 74 and 76 and can be moved up or down between the axle at point 80 and the floor. Movement is accomplished by rotating support structure 14 clockwise or counter clockwise by gripping nut-like portion 20. When support structure 14 is rotated, the shaft portion 46 of shaft means 16 is rotated through the threaded portion moving the foot portion up or down. Because foot portion 48 is free to rotate on the end of shaft portion 46, the foot portion 48 rotates with the dual wheels 74 and 76 of the castor when the foot portion is in a remote position.

In the embodiment of FIGS. 1 and 2, the upper end of shaft portion 46 is shown slotted. A screw driver inserted here and turned will move the jack means up or down.

While the present invention has been disclosed with the preferred embodiment thereof, it should be understood that there may be other embodiments that fall within the spirit and scope of the invention as defined by the following claims.

I claim:

1. A combination castor/jack assembly for supporting a movable frame comprising:

support structure for mounting said assembly to said frame;

jack means for fixing the position of said frame in a predetermined position on the floor, said jack means adjustably mounted to said support structure for movement between a remote position and a floor contact position, said jack means comprises a shaft portion and an elongated foot portion movably attached to a first end of said shaft portion for rotation thereabout, a first end of said shaft portion is ball shaped and said foot portion comprises an opening which is threaded in part and which is formed to receive said ball shaped first end, said jack means further comprising a threaded tapered nut for holding said ball portion within said opening; and castor means for enabling rolling movement of said frame when said jack means is in the remote position, said castor means rotatably mounted to said support structure.

2. A combination castor/jack assembly for supporting a movable frame comprising:

support structure for mounting said assembly to said frame, said support structure comprises a nut-like portion and at least one elongated portion connected to said nut-like portion, and said support apparatus further comprise a hollow bolt which is attached to said frame and is disposed to receive said elongated portion of said support structure with a friction fit;

jack means for fixing the position of said frame in a predetermined position on the floor, said jack means adjustably mounted to said support structure for movement between a remote position and a floor contact position; and castor means for enabling rolling movement of said frame when said jack means is in the remote position, said castor means rotatably mounted to said support structure.

* * * * *